United States Patent [19]

Schowiak

[11] Patent Number: 4,958,769
[45] Date of Patent: Sep. 25, 1990

[54] COMPRESSED O-RING SPRAY GUN NEEDLE VALVE SEAL
[75] Inventor: Duane C. Schowiak, Novi, Mich.
[73] Assignee: Ford Motor Company, Dearborn, Mich.
[21] Appl. No.: 289,854
[22] Filed: Dec. 27, 1988
[51] Int. Cl.⁵ .......................... B05B 7/02; B05B 15/02
[52] U.S. Cl. .................................. 239/114; 239/123; 239/DIG. 4; 251/214; 251/900
[58] Field of Search ............... 239/DIG. 4, DIG. 14, 239/114, 115, 116, 123; 251/214, 321, 900

[56] References Cited
U.S. PATENT DOCUMENTS

| 2,484,102 | 10/1949 | Le Valley |  |
|---|---|---|---|
| 2,690,360 | 9/1954 | Young |  |
| 3,144,210 | 8/1964 | Levy | 239/116 |
| 3,194,502 | 7/1965 | West |  |
| 3,233,863 | 2/1966 | Bowen et al. | 251/214 |
| 3,419,247 | 12/1968 | Bosi | 251/214 |
| 3,441,249 | 4/1969 | Aslan | 251/214 |
| 3,515,371 | 6/1970 | King et al. | 251/214 |
| 3,524,593 | 8/1970 | Buckley et al. |  |
| 3,568,976 | 3/1971 | Thumm | 251/214 |
| 4,262,847 | 4/1981 | Stitzer | 239/112 |
| 4,560,109 | 12/1985 | Teruyuki et al. |  |
| 4,687,180 | 8/1987 | Simonelli et al. |  |

Primary Examiner—Andres Kashnikow
Assistant Examiner—Karen B. Merritt
Attorney, Agent, or Firm—Lorraine S. Melotik; Damian Porcari; Roger L. May

[57] ABSTRACT

This invention is directed to a seal for a needle valve stem in devices used to dispense a fluid. The seal comprises an O-ring in radial and annular compression about the outside cylindrical portion of a needle valve stem.

2 Claims, 1 Drawing Sheet

COMPRESSED O-RING SPRAY GUN NEEDLE VALVE SEAL

FIELD OF THE INVENTION

This invention relates to the valve art and, more particularly, to a seal for a needle valve stem.

BACKGROUND OF THE INVENTION

Needle valve mechanisms are often employed in a shaft of a fluid dispensing device to control the flow of the fluid. For example, conventional paint spray guns generally employ a needle valve stem to control the flow of the paint. In such devices, a sealing means is present about the needle valve stem to prevent the sprayable fluid from leaking out of the spray gun shaft, e.g., out of or into the body of the gun, when the needle valve stem is moved back and forth. Commercially available spray gun needle valve stem seals conventionally comprise a packing of string and graphite or teflon felt. Generally, the packing materials are mechanically compressed around the stem by means of a packing gland to form a seal. As the needle valve is moved back and forth in order to start and stop the paint flow, however, paint material eventually works its way into the interface between the packing and the needle valve stem which results in the binding of the needle. Even when the spray gun is frequently purged, the purge solvent does not effectively clean the needle in the area of the packing. The paint can also work its way into the porous packing and, particularly when the chemically reactive materials are two-component urethane paints which cure readily, deteriorate and harden the packing materials which then provide a less than effective seal.

As discussed in U.S. Pat. No. 4,560,109, conventional packing materials of this type wear down as the needle valve stem is repeatedly reciprocated and a packing gland is used in an attempt to tighten the packing and maintain a tight seal. This patent discloses that in prior art sealing means of this type, however, a tight seal cannot be obtained. The patent invention attempts to overcome this problem by providing a sealing device for a needle valve stem which comprises an annular main packing having a concave portion formed therein and an auxiliary packing having rubber elasticity fitted in the concave portion. According to the patent, as the main packing is worn away, a packing gland is tightened against the main packing which deforms the auxiliary packing, this auxiliary packing then uniformly presses the main packing against the circumference of the needle valve stem to maintain a seal. However, such a sealing device requires somewhat complex fabrication of the main and auxiliary packing. Additionally, the design of the main packing provides for a relatively high contact area between the needle valve stem and the main packing, and as a consequence, offers potential for undesirably high friction between the stem and main packing.

An object of the present invention is to provide a sealing means capable of providing a snug (fluid tight) seal for a cylindrical sliding portion of a needle valve stem used in a device for dispensing a fluid, i.e., to keep the fluid from leaking out rearwardly past the stem of the device. Another object of the present invention is provide a sealing means which has a relatively small surface area in contact with the needle valve stem and, as a result, very low friction between the seal and the needle valve stem. Another object of the present invention is to provide a seal which is not complex in design, is easily flushable, and which has improved efficiency at high paint pressures. It is yet another object of this invention to provide a sealing means which maintains a fluid tight seal on the needle valve stem even if a portion of the seal is worn off by the sliding action of the needle valve stem against the seal. Such objects are attained by the present invention which overcomes the deficiencies of prior art needle valves stem seals as discussed above.

DISCLOSURE OF THE INVENTION

This invention is directed to a seal for a needle valve stem in a device used to dispense a fluid. The seal prevents the dispensable fluid from leaking rearwardly out past the stem. The needle valve stem seal is provided on an outside cylindrical sliding portion of said needle valve stem and interposed between the needle valve stem and the body of the device. The needle valve stem seal comprises a resilient, o-ring which is mechanically, radially and annularly compressed into an annular well in a bore surrounding the needle valve stem. The O-ring is compressed by a cylindrical compression means having an annular recess at one end. The o-ring (i) has in its uncompressed state an inner diameter larger than the outer diameter of the needle valve stem, (ii) annular width greater than the width of the annular recess, and (iii) an outer diameter larger than the inner diameter of the annular well. The o-ring provides in its compressed state a snug seal against the annular well and a snug seal against the outside cylindrical diameter of the needle valve stem.

The device may be a spray device for dispensing a fluid such as paint. One advantage of the present invention is that it is simple to fabricate as compared to prior art seals. Further, the simplicity of design allows it advantageously to be easily flushed with solvent to remove any fluid which may be accumulating near the seal. Still further, it advantageously provides an effective fluid tight seal while having a minimum of contact area between the seal and the needle valve stem, thus keeping the friction between the seal and the valve stem to a minimum during reciprocation of the needle valve stem. Because the present invention provides an excellent seal, it is particularly advantageous in that it can be used in used in a paint spray device for spraying two-component paints.

DESCRIPTION OF PREFERRED EMBODIMENTS OF THE INVENTION

Figure 1:
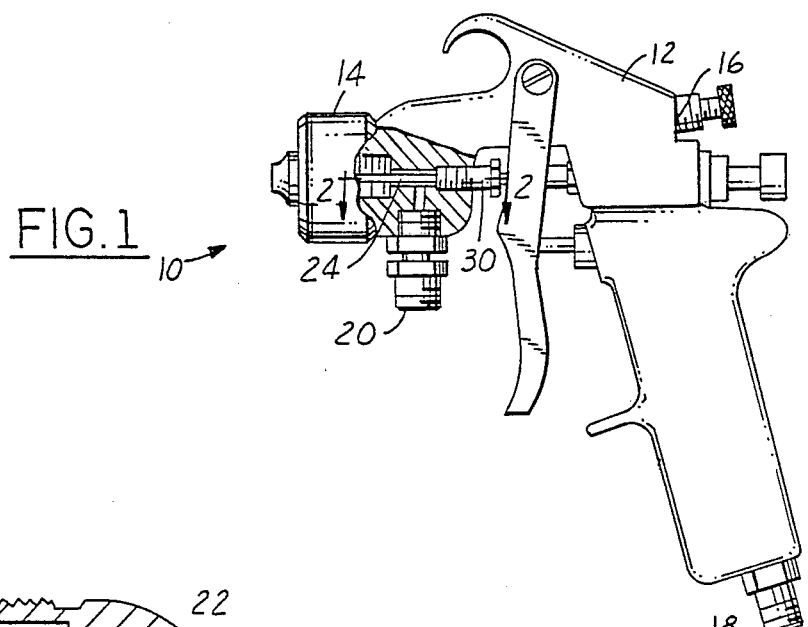
FIG. 1 is a partial cutaway longitudinal cross-sectional view of a paint spray gun provided with an embodiment of the present invention needle valve seal.

Referring now to the drawing, wherein the same numeral in different figures refers to the same item and the showings are to illustrate preferred embodiments of the invention only, not for the purpose of limiting same, FIG. 1 shows a paint spray gun 10 provided with an embodiment of the present invention in partial cutaway cross-sectional view. The gun 10 comprises a main body portion 12, a nozzle portion 14 and a rearward control portion 16. A coupling for connection to a compressed air hose is shown at 18 and a coupling for connection to a source of the liquid to be sprayed is shown at 20.

Figure 2:
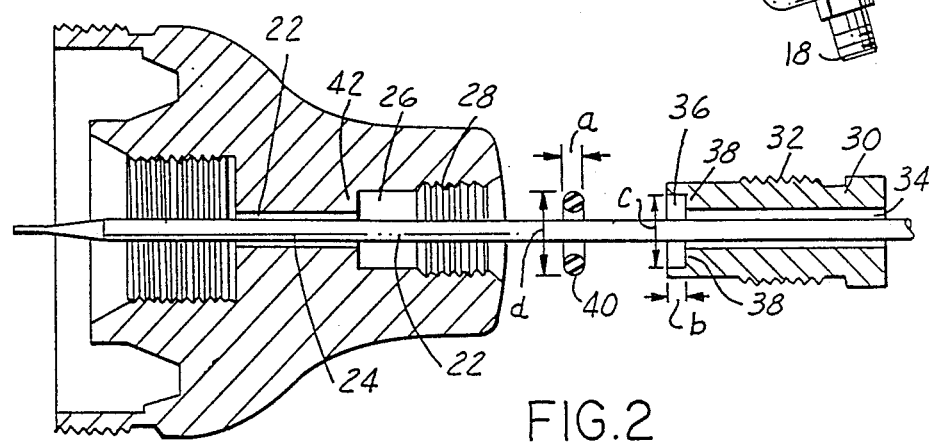
FIG. 2 is an enlarged cross-sectional view of the constituent parts of the needle valve seal of FIG. 1 taken along lines 2—2.

Now referring to FIG. 2 of the drawings, here is shown the consistent parts of a seal taken along lines 2—2 of FIG. 1 for the needle valve stem aimed at preventing leakage of the liquid. Without a seal, bore 22 through which stem 24 of the needle valve slides rightward and leftward in the drawing would be subject to leakage of the liquid rearwardly when the gun is in operation. The bore 22 widens out to form a large bore 26 provided with threads 28 in the sidewalls thereof. Cylindrical compression means 30 is provided with external threads 32 which are cooperable with enlarged threaded bore 26. Compression means 30 is provided with a bore 34 coaxial with bore 22. The left end (in the figure) of compression means 30 is provided with an annular recess 36 having an o-ring confining shoulder 38. The end of cylindrical compression means 30 is provided with the annular recess 36 to receive o-ring 40 therein. The o-ring in its uncompressed state has (i) an inner diameter larger than the diameter of needle valve stem 24, (ii) an annular width, a, greater than the width, b, of the annular recess, and (iii) an outer diameter, d, greater than the inner diameter, c, of the annular well. Since the outer diameter of the o-ring is larger than the inner diameter of the annular well, the o-ring, when received in the annular recess 36 at the end of cylindrical compression means 30 and before the compression means 30 is threaded into enlarged bore 26, is radially compressed so that it expands radially inward and seals against the needle valve stem, however this radial compression is not sufficient by itself to provide a snug seal as would be required to prevent the leakage of a fluid, e.g., paint under pressure.

Figure 3:
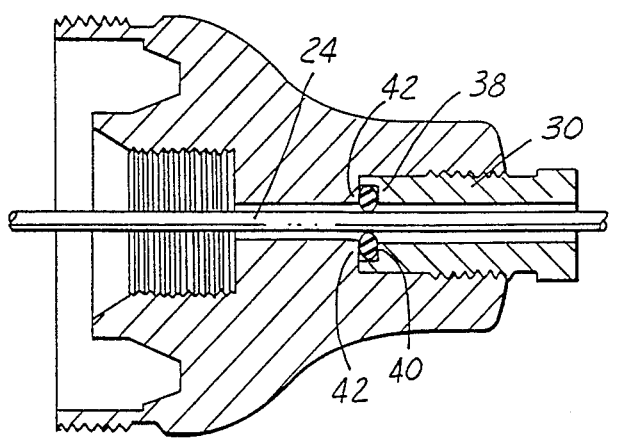
FIG. 3 is a view of the needle valve seal of FIG. 2 in assembled condition.

FIG. 3 shows the o-ring 40 received in the annular recess 36 of the cylindrical compression means 30 in radial and annular compression. As shown in FIG. 3, when the compression means 30 is threaded into enlarged bore 26, shoulders 38 annularly compress the o-ring so that it radially expands further inward to form a snug (fluid tight) seal between the stem 24 and the shoulders 42 of the enlarged bore 26 and the sides of the walls of the recess 36 in compression means 30. Thus, when the cylindrical compression means 30 is threaded into enlarged bore 26 as mentioned above, the o-ring provides in its compressed state a snug seal against the annular well as well as a snug seal against the outside cylindrical diameter of the needle valve stem. This arrangement of the o-ring prevents fluid from bypassing between the stem and the bore. In order for the o-ring to form a snug seal against the annular well, it is not necessary that the compressed o-ring contact all surfaces of the annular well. It is sufficient that the periphery of the compressed o-ring contact in continuous fashion at least a portion of the walls of the annular well so as to prevent fluid from leaking out between the o-ring and the annular well. If the center opening of the o-ring is worn off in some amount during substantial repeated reciprocation of the valve stem, the radial and annular compression provided on the o-ring by the annular well continues to maintain a fluid tight seal against the stem of the needle valve. Should it be desirable to apply further pressure between the o-ring and the valve stem, the cylindrical compression means 30 can be threaded down further into enlarged bore 36, if it has not been threaded down all the way. Such additional threading down of the cylindrical compression means 30, however, has not been found necessary even with continued prolonged use of a high pressure paint spray gun dispensing two-component paint. In order to easily flush the device, including the seal, the seal is preferably located near the inlet 20 for the dispensable fluid, which inlet also would be used to flush the device.

The o-ring may be made of any material which is suitably chemically resistant, particularly to the dispensable fluid or solvents which may be used in the device. The o-ring, in additional to being suitably resistant to chemical attack as described, must be suitably flexible to allow annular compression as described herein and possess a suitable low coefficient of friction so as to not impede reciprocation of the needle valve stem through the o-ring during operation of the device. Exemplary of such materials which may be used to make this invention o-ring, particularly when the device is a paint spray gun dispensing conventional paints, are flexible Teflon derivatives such as Kalrez (trademark, Du Pont, Tralee Park, Wilmington, Del.), ethylene propylene diene rubber (EPR), and the like.

As would be apparent to one skilled in the art in view of the present disclosure, the invention seal may be employed in an internal portion of a paint spray gun to prevent the leakage of paint into the internal portion of the gun through the bore. Additionally, such seals may be used in other types of devices employing a needle valve, e.g., in devices uses to dispense other fluids such as adhesives and sealers which may be under pressure.

While particular embodiments of the invention have been described, it will be obvious to those skilled in the art that various changes and modifications may be made without departing from the invention, and it is intended to cover in the appended claims all such modifications and equivalents as fall within the true spirit and scope of this invention.

I claim:

1. A seal for a needle valve stem in a paint spray gun used to dispense a two component paint, said seal being provided on an outside cylindrical sliding portion of said needle valve stem and being interposed between said needle valve stem and body of said spray gun, said seal comprising a resilient O-ring, said O-ring being made from a material having a low solvent resistance and a low coefficient of friction, being mechanically, radially and annularly compressed into an annular well in a bore surrounding said needle valve stem, and being compressed between said annular recess and said annular well by a cylindrical compression means, said O-ring (a) having in its uncompressed state (i) an inner diameter larger than the outer diameter of said needle valve stem, (ii) an annular width greater than the width of said annular recess, and (iii) an outer diameter greater than the inner diameter of said annular well and (b) providing in its compressed state a snug seal against said annular well and a snug seal against the outside diameter of said needle valve stem.

2. The seal for said needle valve stem according to claim 1, wherein said material is selected from flexible Teflon derivatives.

* * * * *